United States Patent
De Vleeschauwer et al.

(10) Patent No.: US 10,826,837 B2
(45) Date of Patent: Nov. 3, 2020

(54) METHOD AND DEVICE FOR TRANSMISSION OF CONTENT

(71) Applicant: Alcatel Lucent, Nozay (FR)

(72) Inventors: Danny De Vleeschauwer, Evergem (BE); Zhe Lou, Antwerp (BE)

(73) Assignee: Alcatel Lucent, Nozay (FR)

( * ) Notice: Subject to any disclaimer, the term of this patent is extended or adjusted under 35 U.S.C. 154(b) by 10 days.

(21) Appl. No.: 16/321,311

(22) PCT Filed: Aug. 10, 2017

(86) PCT No.: PCT/EP2017/070287
§ 371 (c)(1),
(2) Date: Jan. 28, 2019

(87) PCT Pub. No.: WO2018/033462
PCT Pub. Date: Feb. 22, 2018

(65) Prior Publication Data
US 2019/0166055 A1 May 30, 2019

(30) Foreign Application Priority Data
Aug. 16, 2016 (EP) .................................... 16306058

(51) Int. Cl.
*H04L 12/26* (2006.01)
*H04L 12/825* (2013.01)
(Continued)

(52) U.S. Cl.
CPC ............ *H04L 47/25* (2013.01); *H04L 47/193* (2013.01); *H04L 47/2416* (2013.01);
(Continued)

(58) Field of Classification Search
CPC ... H04L 47/25; H04L 65/602; H04L 65/4092; H04L 65/4084; H04L 65/80;
(Continued)

(56) References Cited

U.S. PATENT DOCUMENTS 6,643,259 B1 * 11/2003 Borella .................. H04L 47/10
370/231
8,060,645 B1 * 11/2011 Catania ................. H04L 1/1838
709/224

(Continued)

FOREIGN PATENT DOCUMENTS

WO   WO-2015/078491   6/2015

OTHER PUBLICATIONS

International Search Report for International Application No. PCT/EP2017/070287 published Sep. 27, 2017.

*Primary Examiner* — Mang Hang Yeung
(74) *Attorney, Agent, or Firm* — Harness, Dickey & Pierce, P.L.C.

(57) ABSTRACT

Embodiments relate to a method for transmission of content, executed by a content transmission device. The method includes receiving, from a client device, a content request specifying a requested content and at least one content reception deadline in an application layer part, encapsulating the requested content in a plurality of successive TCP segments; and sending the successive TCP segments to the client device by applying a congestion avoidance mechanism using a congestion window. The congestion window is determined by determining a minimum bitrate required for transmitting the requested content to the client device by the content reception deadline, determining a round-trip time between the content transmission device and the client device, and setting the congestion window equal to or greater than the product of the minimum bitrate and the round-trip time.

7 Claims, 1 Drawing Sheet

(51) Int. Cl.
  *H04L 29/06* (2006.01)
  *H04L 12/801* (2013.01)
  *H04L 12/853* (2013.01)
  *H04L 12/807* (2013.01)
  *H04L 12/841* (2013.01)

(52) U.S. Cl.
  CPC ............ H04L 47/27 (2013.01); H04L 47/283 (2013.01); H04L 65/4084 (2013.01); H04L 65/4092 (2013.01); H04L 65/602 (2013.01); H04L 65/80 (2013.01)

(58) Field of Classification Search
  CPC ... H04L 47/193; H04L 47/2416; H04L 47/27; H04L 47/283
  USPC ........................................................ 370/235
  See application file for complete search history.

(56) References Cited

U.S. PATENT DOCUMENTS

| | | | |
|---|---|---|---|
| 2006/0045011 A1* | 3/2006 | Aghvami | H04L 47/10 370/230 |
| 2010/0191805 A1* | 7/2010 | Lu | H04L 67/2842 709/203 |
| 2012/0185541 A1* | 7/2012 | Varvello | H04L 67/1061 709/206 |
| 2015/0058441 A1* | 2/2015 | Weizman | H04L 67/2842 709/217 |
| 2016/0057064 A1 | 2/2016 | Appleby et al. | |

* cited by examiner

METHOD AND DEVICE FOR TRANSMISSION OF CONTENT

CROSS-REFERENCE TO RELATED APPLICATIONS

This application is a national phase under 35 U.S.C. § 371 of PCT International Application No. PCT/EP2017/070287 which has an international filing date of Aug. 10, 2017, which claims priority to European Application No. 16306058.5, filed Aug. 16, 2016, the entire contents of each of which are hereby incorporated by reference.

FIELD OF THE INVENTION

The present invention relates to the field of telecommunications. In particular, the present invention relates to deadline-aware content transmission.

BACKGROUND

Deadline-aware content delivery protocols such as SCAP (Shared Content Addressing Protocol), $D^2TCP$ and $D^3$ allow a client to specify by when it needs a piece of content (e.g., a video segment) on top of specifying what it wants. This allows the servers (and possibly the intermediate nodes in the network) to better schedule the delivery (and caching) of the pieces of content, thus improves the network efficiency.

However, SCAP and $D^3$ require considerable changes to the usual TCP/IP protocol stacks, which creates a high barrier to get into market. Also, $D^2TCP$ can only be used on the datacenter context as on the open Internet it would completely starve the regular flows.

SUMMARY

It is thus an object of embodiments of the present invention to propose methods and devices for transmission of content, which do not show the inherent shortcomings of the prior art.

Accordingly, embodiments relate to a method for transmission of content, executed by a content transmission device, comprising:
  receiving, from a client device, a content request specifying a requested content and at least one content reception deadline in an application layer part,
  encapsulating the requested content in a plurality of successive TCP segments, and
  sending the successive TCP segments to the client device by applying a congestion avoidance mechanism using a congestion window,
wherein said congestion window is determined by:
  determining a minimum bitrate required for transmitting the requested content to the client device by the content reception deadline,
  determining a round-trip time between said content transmission device and said client device, and
  setting said congestion window equal to or greater than the product of said minimum bitrate and said round-trip time.

Correspondingly, embodiments relate to a content transmission device comprising means configured for executing the content transmission method.

In some embodiments, the method comprises determining a fair share congestion window, and setting said congestion window equal to or lower than the sum of said fair share congestion window and the product of said minimum bitrate and said round-trip time, and equal to or greater than said fair share congestion window.

The method may comprise updating said congestion window in function of an updated minimum bitrate.

In some embodiments, the method comprises:
  in response to receiving said content request, determining a release time in function of the content reception deadline,
  starting said encapsulating and said sending the successive TCP segments on or after said release time.

In some embodiments, the content transmission device is a content server, and the method comprises:
  receiving another content request specifying a requested content, at least one content reception deadline and caching information in an application layer part, wherein said caching information specifies a caching node from which said requested content may be obtained, and
  sending, to the client device, said caching information.

In some embodiments, the content transmission device is a caching node, and the method comprises:
  receiving, from a client device, another content request sent from said client device to a content server, specifying a requested content and at least one content reception deadline,
  appending, to said other content request, caching information specifying that said requested content may be obtained from said caching node,
  sending said other content request with said caching information to the content server.

Embodiments also relate to a computer program comprising instructions for performing the method mentioned before when said instructions are executed by a computer.

BRIEF DESCRIPTION OF THE DRAWINGS

The above and other objects and features of the invention will become more apparent and the invention itself will be best understood by referring to the following description of embodiments taken in conjunction with the accompanying drawings wherein.

DESCRIPTION OF EMBODIMENTS

Figure 1:
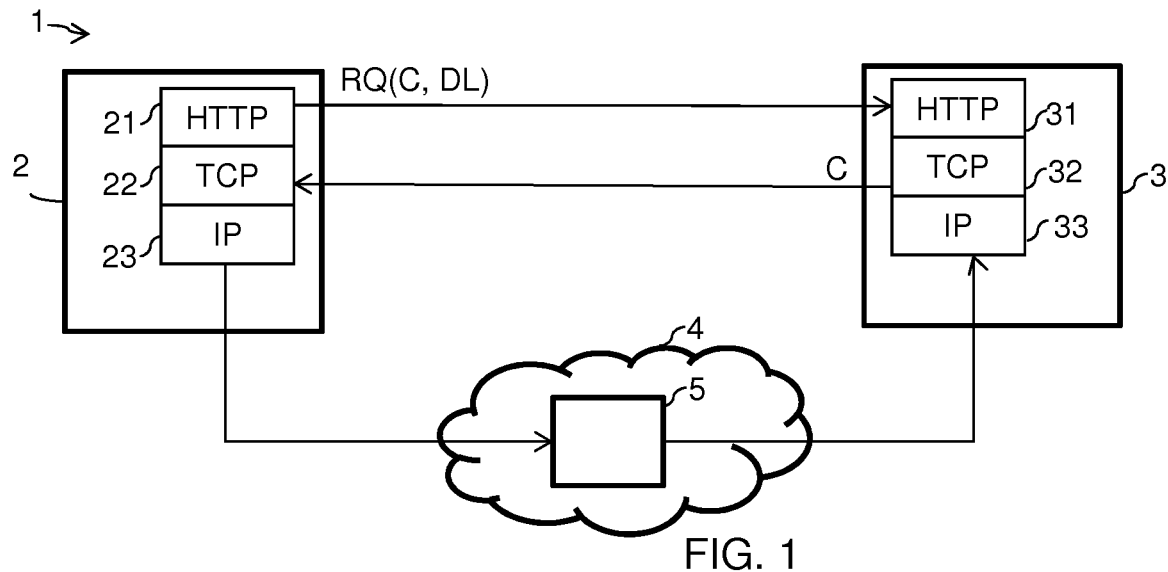
FIG. 1 is a block diagram of a system for content transmission.

FIG. 1 is a block diagram of a system 1 for deadline-aware content transmission. The system 1 comprises one or more client devices 2 and one or more content server 3 connected by a network 4. In some embodiments, the system 1 also comprises one or more caching nodes 5 between a client device 2 and a content server 3.

A client device 2 is capable of requesting content from content servers 3 and of consuming content received from the content server 3. Here, consuming content may comprise displaying a multimedia document such as a webpage or a video, storing and/or processing content . . . . A client device 2 comprises a protocol stack for communication on the network 4, which includes an HTTP module 21, a TCP module 22 and an IP module 23 (HTTP, TCP and IP respectively mean hypertext transfer protocol, transmission control protocol and Internet protocol).

A content server 3 stores content and sends requested content to client devices 2 in response to requests. A content server 3 comprises a protocol stack for communication on the network 4, which includes an HTTP module 31, a TCP module 32 and an IP module 33.

A caching node 5 may cache content stored by a content server 3 and sends requested content to client device 2 in response to requests. A caching node 5 comprises a protocol stack for communication on the network 4, which includes an HTTP module, a TCP module and an IP module (not illustrated).

The system 1 uses deadline-aware content delivery. Accordingly, a request RQ from a client device 2 to a content server 3 specifies, in addition to the requested content C, a content reception deadline DL. The content reception deadline DL specifies at least when the requested content C should be received by the client device 2. Alternatively, a begin and end deadline (or even richer deadline information) could be specified. The request RQ specifies the requested content C and the content reception deadline DL in an application layer part. For example, the request RQ is a HTTP GET message and specifies the content reception deadline DL as a variable in a URI: http://www.server.com/video.mp4?deadline=100 s.

Figure 2:
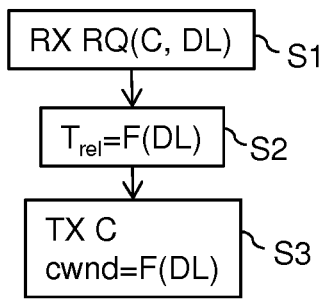
FIG. 2 is a flowchart of a method for content transmission, executed by a content transmission device of the system of FIG. 1.
Figure 3:
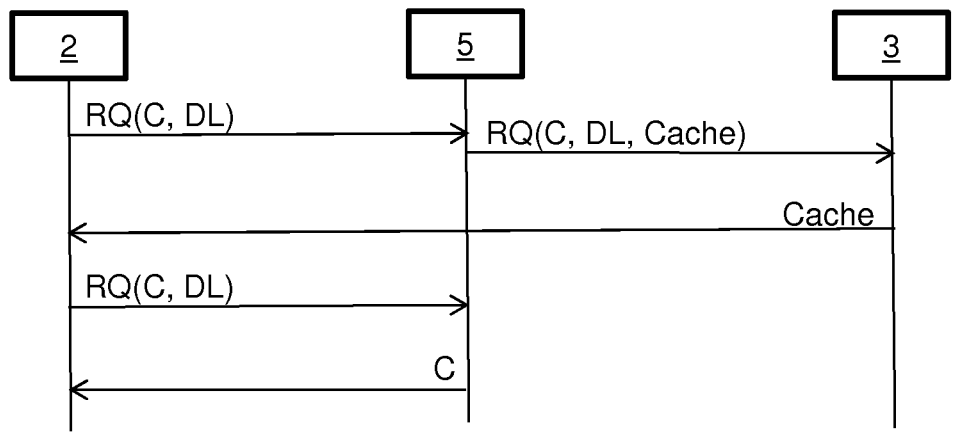
FIG. 3 is a communication diagram of cache delivery in the system of FIG. 1.

The content server 3 and the caching node 5 take the specified content reception deadline DL into account for processing the request RQ, as described hereafter with reference to FIGS. 2 and 3.

FIG. 2 is a flowchart of a method for transmission of content, executed by a content server 3.

The content server 3 receives, from a client device 2, a request RQ which specifies a content C and a deadline DL (step S1). The request RQ passes through the protocol stack to the HTTP module 31.

In the content server 3, the HTTP module 31 comprises a software decision component that decides when the requested content C is released to the TCP module 32. Accordingly, in response to receiving the request RQ, the content server 3 determines a release time $T_{rel}$ for releasing the requested content C from the HTTP module 31 to the TCP module 32 (step S2). The release time $T_{rel}$ is determined for example in function of the size of the content C, the current time and the deadline DL.

This delaying of the content piece is in stark contrast to a traditional server where the piece of content is released immediately to the TCP layer. By delaying the pieces of content by a certain time, the content server 3 can more or less tune how much deadline-aware traffic it sends on the network. By restricting the amount of deadline-aware traffic, the server may keep sufficient headroom for non-deadline-aware traffic, thus being more friendly to non-deadline-aware traffic.

When it releases the content C to the TCP module 32, the HTTP module 31 specifies the deadline DL to the TCP module 32. For example, the deadline DL is specified in the "date" field of the HTTP header (which usually specifies the release date).

Then, the TCP module 32 of the content server 3 transmits the content C to the client device 2, taking the deadline DL into account (step S3). More specifically, the content server 3 encapsulates the requested content in a plurality of successive TCP segments, and sends the successive TCP segments to the client device 3 by applying a congestion avoidance mechanism using a congestion window cwnd.

The TCP module 32 tries to give priority to the deadline-aware traffic: the nearer the deadline DL is, the more priority is given; but if the deadline DL is violated, no priority is given. When the HTTP module 31 releases a new piece of content to the TCP layer, the TCP module 32 goes through the connection set-up as traditional TCP. However, the congestion window updating process of the TCP module 32 is different than existing solutions. Initially, the TCP module 32 also starts with a slow start phase. During congestion avoidance, the TCP module 32 determines the congestion window cwnd in function of the deadline DL.

For example, the TCP module 32 determines a traditional fair share congestion window $cwnd_{trad}$ according to one of the known methods such as TCP CUBIC or TCP RENO, and also a congestion window that is needed to reach all deadlines, i.e., $cwnd_{dla}=R_{min} \cdot RTT$, where $R_{min}$ is the minimum byte rate required to just reach the deadline DL (and $R_{min}$ is set to 0 if the deadline DL is violated) and RTT is the measured Round Trip Time (measured in the same way as traditional TCP measures the RTT). The congestion window $cwnd_{tot}$ that is used, is a function of $cwnd_{trad}$ and $cwnd_{dla}$. Various functions could be considered, and the following examples give the two limits: 1) $cwnd_{tot}=\max(cwnd_{trad}, cwnd_{dla})$ and 2) $cwnd_{tot}=cwnd_{trad}+cwnd_{dla}$. The former one guarantees (as long as the TCP connection can remain in the congestion avoidance phase) that all deadlines are just met. The latter one is more aggressive: (as long as the TCP connection can remain in the congestion avoidance phase) it obtains the TCP fair share plus the rate that is required to meets the deadlines (so that most likely the deadlines will be met by a noticeable margin). Which one of the two schemes is most appropriate will depend on how aggressive the HTTP module 31 is set to be, i.e., how much deadline-aware traffic it sends on the network: if the HTTP module 31 is already aggressive, it is better to use the former scheme, while if the HTTP module 31 restricts the amount of deadline-aware traffic on the network, the latter scheme is preferred.

The required byte rate $R_{min}$ is calculated, when the HTTP module 31 releases the bytes to the TCP module 32, as the number of bytes of the content C divided by the time to deliver them (=deadline−now). If deadline<now (meaning that the deadline is violated), $R_{min}$ is set to 0. In principle, in HTTP/1.0 for each content C a new TCP connection is set up. There are two possible extensions: 1) $R_{min}$ can be updated gradually as the information gets transported, and 2) instead of using a TCP connection per piece of content, a persistent TCP connection (similar to the one used in HTTP/1.1) can be used to transport all the pieces. This can be indicated in the "connection: keep-alive" field. Both extensions require a more complicated calculation of $R_{min}$.

FIG. 3 is a communication diagram in the system 1, in an embodiment comprising at least one caching node 5.

A caching node 5 is an intermediate node between a client device 2 and a content server 3. The caching node 5 inspects passing HTTP requests and checks whether it is a request RQ specifying a content C and a deadline DL.

Accordingly, when a client device 2 sends a request RQ specifying a content C and a deadline DL to the content server 3, the request RQ passes through the caching node 3 and is identified as such.

In response to identifying a request RQ specifying a content C that it already caches or plans to cache (sufficiently long before the specified deadline), a caching node 5 alters the HTTP request by including Cache information specifying that it is able to deliver the requested content itself. For example, the caching node 5 appends a string "&CanServe[k]=address_of_the_intermediate/piece_name" where k is a counter, initialized to 1 and increased by 1 each time an intermediate node alters the URI. This additional variable communicates to the content server 3 that the caching node 5 could serve the piece of content.

Upon receipt of such an URI, the content server 3 may delegate (which is a decision that is based on the time left to deliver it) the delivery of that piece of content to (one of) the caching node 3 by sending, to the client device, a message including information specifying how to contact the caching node 5 for the requested content C. For example, the content server 3 returns a message with header HTTP/1.0 302 Found Location: http://address_of_the_intermediate/piece_name/piece_name"

. . .

to the requesting client device 2.

The requesting client then needs to reissue the request RQ to the caching node 5. The caching node 5 subsequently takes the role of the server, and may deliver the content based on the method described with reference to FIG. 2.

A caching procedure runs on the caching node 5, that ensures that the content pieces that it promised to deliver are actually on the caching node 5 at the time they need to be delivered. In order to achieve this task the caching node 5 issues requests to servers.

The system 1 uses deadline-aware content delivery. This allows efficient use of the network resources such as available bandwidth. Moreover, since the request RQ specifies the content C and the deadline DL at application layer (for example in HTTP header), no substantial change to the TCP/IP protocol stack is required. In particular, a client device 2 may use known TCP/IP protocol stacks, and the content server 3 and caching node 5 rely on a HTTP module 31 and a TCP module 32 having the features described here before. Since various TCP versions exist and configuring a server by patching a given TCP version is a common operation, this does not involve a high barrier to get into market.

Note that the system 1 is designed for working over a well-dimensioned network 4, and that there is an inherent safeguard in the system 1 to prevent congestion collapse. Since the TCP congestion control of the TCP module 32 has the behavior of existing TCP version during the slow start phase and detects time-outs in the same way, and since under heavy congestion TCP tends to reside in the slow start phase, the system 1 will not cause congestion collapse of the Internet (any more than traditional TCP would do).

Figure 4:
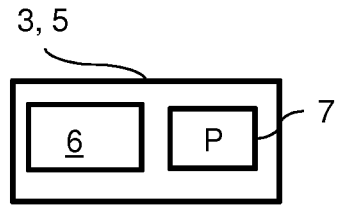
FIG. 4 is a structural view of a content transmission device of the system of FIG. 1.

FIG. 4 is a structural view of the content transmission device, which may be a content server 2 or a caching node 5. The content transmission device comprises a processor 6 and a memory 7. The memory 7 stores a computer program P which, when executed by the processor 6, causes the content transmission device to execute one of the method described above with reference to FIGS. 2 and 3.

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing architecture. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represents various processes which may be substantially represented in computer readable medium and so executed by a computer or processor, whether or not such computer or processor is explicitly shown.

Embodiments of the method can be performed by means of dedicated hardware and/of software or any combination of both.

While the principles of the invention have been described above in connection with specific embodiments, it is to be clearly understood that this description is made only by way of example and not as a limitation on the scope of the invention, as defined in the appended claims.

The invention claimed is:

1. A method for transmission of content, executed by a content transmission device comprising:

receiving, from a client device, a content request specifying a requested content and at least one content reception deadline in an application layer part;

determining a release time as a function of the content reception deadline, encapsulating the requested content in a plurality of successive TCP segments; and sending the successive TCP segments to the client device by applying a congestion avoidance mechanism using a congestion window, wherein the encapsulating and the sending are started on or after the release time, and wherein said congestion window is determined by, determining a minimum bitrate required for transmitting the requested content to the client device by the content reception deadline, determining a round-trip time between said content transmission device and said client device, and setting said congestion window equal to or greater than the product of said minimum bitrate and said round-trip time.

2. The method according to claim 1, further comprising:

determining a fair share congestion window; and setting said congestion window equal to or lower than the sum of said fair share congestion window and the product of said minimum bitrate and said round-trip time, and equal to or greater than the greater of said fair share congestion window and said product of said minimum bitrate and said round trip.

3. The method according to claim 1, further comprising:

updating said congestion window as a function of an updated minimum bitrate.

4. The method according to claim 1, wherein said content transmission device is a content server, the method further comprising:

receiving another content request specifying a requested content, at least one content reception deadline and caching information in an application layer part, wherein said caching information specifies a caching node from which said requested content is obtainable, and sending, to the client device, said caching information.

5. The method according to claim 1, wherein said content transmission device is a caching node, the method further comprising:

receiving, from a client device, another content request sent from said client device to a content server, specifying a requested content and at least one content reception deadline, appending, to said other content request, caching information specifying that said requested content is obtainable from said caching node, and sending said other content request with said caching information to the content server.

6. A non-transitory computer-readable medium storing computer-executable instructions which when executed by a computer cause the computer to:

receive, from a client device, a content request specifying a requested content and at least one content reception deadline in an application layer part;

determine a release time based on the content reception deadline;

encapsulate the requested content in a plurality of successive TCP segments; and send the successive TCP segments to the client device by applying a congestion avoidance mechanism using a congestion window, wherein the encapsulating and the sending are started on or after the release time, and wherein said congestion window is determined by,
determining a minimum bitrate required for transmitting the requested content to the client device by the content reception deadline,
determining a round-trip time between a content transmission device and said client device, and
setting said congestion window equal to or greater than the product of said minimum bitrate and said round-trip time.

7. A content transmission device, comprising:
a memory storing a computer program; and
a processor configured to execute the computer program, which configures the processor to,
receive, from a client device, a content request specifying a requested content and at least one content reception deadline in an application layer part,
determine a release time based on the content reception deadline,
encapsulate the requested content in a plurality of successive TCP segments, and
send the successive TCP segments to the client device by applying a congestion avoidance mechanism using a congestion window,
wherein the encapsulating and the sending are started on or after the release time, and
wherein said congestion window is determined by,
determining a minimum bitrate required for transmitting the requested content to the client device by the content reception deadline,
determining a round-trip time between said content transmission device and said client device, and
setting said congestion window equal to or greater than the product of said minimum bitrate and said round-trip time.

* * * * *